Aug. 20, 1968  J. N. J. ANDERSSON  3,397,716
CONTROL TO RENDER DISCHARGE PUMP OPERABLE BEFORE LIQUID IN A
RECEPTACLE REACHES OVERFLOW LEVEL
Filed Nov. 16, 1965
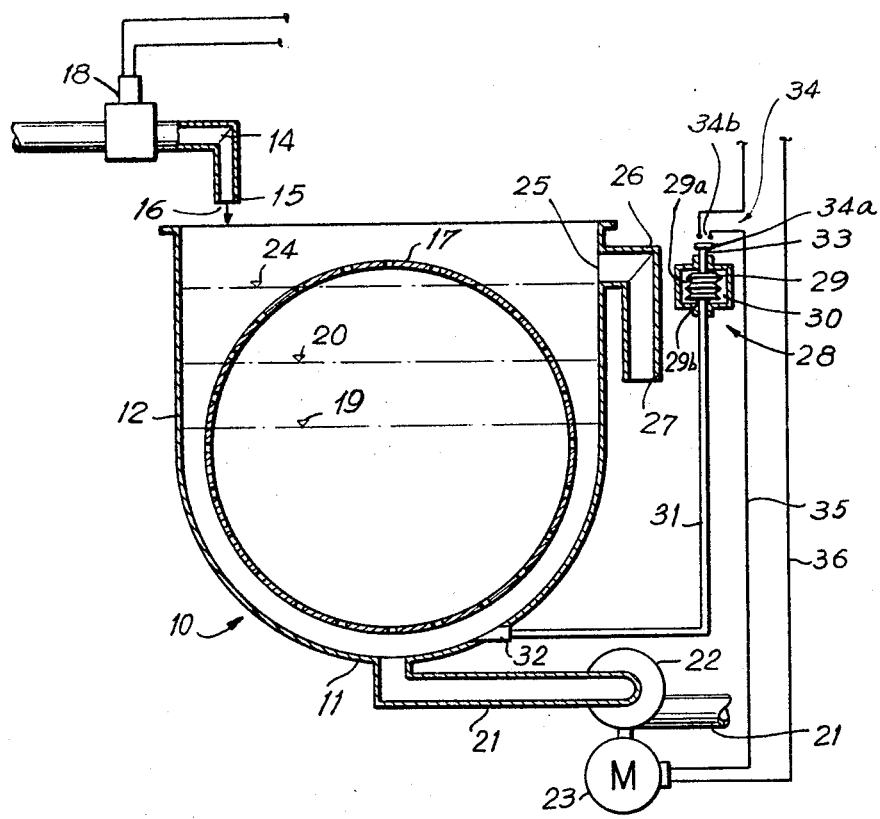
INVENTOR,
John Nils Jakob Andersson
BY
his ATTORNEY United States Patent Office 3,397,716
Patented Aug. 20, 1968

3,397,716
CONTROL TO RENDER DISCHARGE PUMP OPERABLE BEFORE LIQUID IN A RECEPTACLE REACHES OVERFLOW LEVEL
John Nils Jakob Andersson, Tullinge, Sweden, assignor to Aktiebolaget Electrolux, Stockholm, Sweden, a corporation of Sweden
Filed Nov. 16, 1965, Ser. No. 508,006
Claims priority, application Sweden, Nov. 20, 1964, 14,066/64
1 Claim. (Cl. 137—394)

ABSTRACT OF THE DISCLOSURE

A washing machine having a receptacle for a body of liquid and a clothes container mounted for movement therein, supplying liquid to the receptacle at a first level which is always above the surface level of the liquid body, overflowing liquid from the receptacle at a second level below the first level, discharging liquid from the bottom of the receptacle by a pump driven by an electric motor connected in an electrical circuit having a normally open switch, a hollow member having a flexible wall portion movable between first and second positions and in its first position when the switch is open, upright piping connected at its upper end to the hollow member and its lower end to the receptacle to receive liquid therefrom during operation of the washing machine at a third level below the second overflow level, the upright piping and hollow member forming a conduit having a gaseous medium confined therein above the surface level of the liquid received from the receptacle, and, when the liquid in the receptacle rises to a fourth level which is above the third level and below the second liquid overflow level, the liquid in the conduit will rise and compress the gaseous medium confined therein to move the flexible wall portion from its first to its second position, thereby causing the switch to close and complete the circuit for the motor to drive the pump.

My invention relates to an improved control to render a discharge pump operable before liquid in a receptacle reaches overflow level.

An object of my invention is to provide an improved liquid level control which energizes a motor driven pump for discharging liquid from the bottom of the receptacle when a body of liquid in the receptacle rises to a warning level which is below a definite level at which overflow of liquid from the receptacle occurs.

Another object is to provide an improved liquid level control of this type in which the motor driven pump becomes energized when static pressure of sufficient magnitude is developed in the body of liquid in the receptacle resulting from rise of liquid level in the receptacle to the warning level.

A further object is to provide an improved control of this type in which the motor driving the pump is connected in an electrical circuit having a normally open relay which is closed by a hollow expandible and contractible member which is connected to the bottom of the receptacle and expands sufficiently to close the relay and energize the motor when the body of liquid in the receptacle rises to the warning level.

Further objects and advantages of the invention will become apparent as the description proceeds, and the features of novelty which characterize the invention will be pointed out with particularity in the claim annexed to and forming a part of this specification.

In the drawing, the single figure is a vertical sectional view of a receptacle and liquid level control therefor embodying my invention.

Referring to the drawing, I have shown my invention as applied to a washing machine including a receptacle 10 having a bottom 11 and upstanding side wall 12. Liquid is supplied to the receptacle 10 from a level above the top thereof through a liquid supply line 14 having a downwardly directed discharge nozzle 15 from which liquid flows through an air gap 16 into the receptacle 10.

An apertured cylinder 17 within the receptacle 10 is adapted to be rotated about a horizontal axis in any suitable manner by an electric motor (not shown). Suitable controls (not shown) may be provided to operate the washing machine to wash and rinse clothes and extract liquid therefrom. During washing and rinsing of clothes, the liquid level in the receptacle 10 desirably is controlled in any well-known manner, as by a solenoid operated valve 18 conected in the liquid supply line 14, for example. The solenoid operated valve 18 may be connected in an electrical circuit in any well-known manner (not shown) to control the flow of liquid in the supply line 14 to shut off the supply of liquid to the receptacle 10 when the body of liquid therein rises to levels 19 and 20 during the washing and rinsing periods, respectively, of a clothes washing cycle.

Liquid is discharged from the bottom 11 of the receptacle 10 through a discharge line 21 to waste or any other suitable place. A liquid discharge pump 22 is connected in the discharge line 21 to pump liquid from the bottom 11 of the receptacle 10 through the discharge line 21. The pump 22 is driven by an electric motor 23. When the liquid level in the receptacle 10 reaches a definite level 24, liquid overflows through an opening 25 in the side wall 12 of the receptacle into an overflow connection 26 having a downwardly directed portion 27.

In accordance with my invention, I provide a liquid level control 28 which energizes the electric motor 23 to render the latter operable to drive the liquid discharge pump 22 when the liquid level in the receptacle 10 rises to a warning level which is above the normal rinsing level 20 and below the level 24 at which overflow of liquid from the receptacle 10 occurs at 25. The liquid level control 28 includes a bellows 29 disposed within a chamber 30. The bellows 29 broadly constitutes an expandible and contractible hollow member which has a flexible wall portions 29a and the bottom of which is fixedly secured at 29b to the upper end of vertically extending piping 31.

The upper end of the piping 31 is connected with an opening in the bottom of the chamber 30. The lower end of the piping 31 is connected at 32 to the bottom 11 of the receptacle 10, whereby liquid flows from the bottom of the receptacle into the lower end of the piping 31 to a level therein which is dependent upon the liquid level of the body of liquid in the receptacle 10. Under abnormal operating conditions resulting from malfunction of the washing machine, the liquid level in the receptacle may rise above the level 20 which normally is maintained during a rinsing period, as explained above, and may rise to a level which may be referred to as a warning level, such warning level being above the rinsing level 20 and below the level 24 at which overflow of liquid from the receptacle 10 occurs.

A gaseous medium, such as air, for example, is retained in the bellows 29 and upper part of the piping 31. When the liquid level in the receptacle 10 rises to the warning level, the gaseous medium is compressed and causes the bellows to expand responsive to the static pressure developed in the body of liquid in the receptacle 10. Since the lower end of the bellows 29 is fixedly secured at 29b to the upper end of the piping 31, the top part of the bellows 29 moves upward with expansion thereof. To the top part of the bellows 29 is fixed a vertical element 33 which extends upward through an opening in the chamber 30. A member 34a of a normally open relay 34 is connected to the upper end of the element 33 and electrically insulated therefrom in any suitable manner (not shown). When the element 33 moves upward sufficiently due to expansion of the bellows 29, the member 34a bridges the contacts 34b of the relay 34 and completes an electrical circuit for the discharge pump motor 23 which includes conduits 35 and 36 adapted to be connected to a source of electrical energy, the contacts 34b of the relay 34 being connected in the conductor 35.

The electric motor 23 when energized in the manner just described causes the pump 22 to discharge liquid from the bottom of the receptacle 10 through the discharge line 21. When the liquid level in the receptacle 10 falls sufficiently below the warning level, the static pressure developed by the liquid body is reduced which in turn reduces the force transmitted to the gaseous medium in the bellows 29 and the upper part of the piping 31. When this occurs, the bellows 29 contracts and effects downward movement of the element 33, the relay member 34a no longer bridges the contacts 34b, and the relay 34 again assumes its normally open circuit position and disconnects the motor 23 from the source of electrical energy.

In view of the foregoing, it will now be understood that the relay 34 functions to energize pump motor 23 responsive to rise of the liquid surface level in the receptacle 10 to the warning level, and to deenergize the pump motor 23 responsive to fall of the liquid surface level in the receptacle 10 from the warning level. With this arrangement, the liquid level in the receptacle 10 will never reach the level 24 at which liquid overflow occurs at the overflow opening 25. Further, the discharge pump 22 desirably is of such capacity that liquid will be discharged from the bottom 11 of the receptacle 10 through the discharge line 21 at a greater rate than that at which liquid can be supplied to the receptacle through the liquid supply line 14.

Although I have illustrated and described a particular embodiment of my invention, I desire not to be limited to the particular arrangement set forth, and I intend in the following claim to cover all modifications which do not depart from the spirit and scope of my invention.

I claim:
1. The combination with
   a washing machine including a stationary receptacle having a bottom and upstanding side for holding a body of liquid therein,
   a clothes container mounted for movement in said receptacle,
   a liquid supply line including a first conduit for supplying liquid to said receptacle at a first level which is always above the liquid surface level of the body of liquid therein,
   said receptacle having an opening in the side thereof at a second level below the first level for overflowing liquid therefrom when the body of liquid in said receptacle reaches the second level therein,
   a liquid discharge line including a second conduit connected to the bottom of said receptacle,
   a pump in said discharge line for pumping liquid therethrough from the bottom of said receptacle, and
   means including an electric motor for driving said pump, of
   conductor means providing an electrical circuit for connecting said motor to a source of electrical energy,
   a normaly open switch in said circuit to render said circuit inoperative to supply electrical energy to said motor,
   structure comprising a plurality of parts for actuating said switch to close the latter and complete said circuit for said motor and drive said pump,
   said pump, when driven by said motor, having sufficient capacity to discharge liquid from the bottom of said receptacle through said discharge line at a greater rate than that at which said liquid supply line is capable of supplying liquid to said receptacle,
   one of said parts comprising a hollow member having a flexible wall portion movable between first and second positions and in its first position when said switch is open and another of said parts comprising vertically extending piping connected at its upper end to said hollow member and at its lower end to said receptacle during operation of the washing machine,
   the lower end of said piping receiving liquid from the bottom of said receptacle at a third level below the second overflow level and flowing upward in said piping toward said hollow member,
   said piping and said hollow member defining a vertically extending third conduit part having a closed upper end and containing the liquid received from said receptacle at the third level thereof,
   a gaseous medium confined within said third conduit part above the surface level of the liquid therein, and
   said parts of said structure functioning responsive to rise of liquid in said receptacle to a fourth level which is above said third level and below said second liquid overflow level and to rise of liquid in said third conduit part and increase in pressure of the gaseous medium to effect movement of said flexible wall portion from its first position to its second position for rendering said structure operable to actuate said switch to close the latter and complete said circuit for said motor and drive said pump.

References Cited

UNITED STATES PATENTS

| | | | |
|---|---|---|---|
| 2,449,634 | 9/1948 | Baade | 68—208 X |
| 2,471,838 | 5/1949 | Ross | 200—83.3 |
| 2,797,702 | 7/1957 | Martin | 137—395 X |
| 2,975,347 | 3/1961 | Schaefer | 137—394 X |
| 3,192,744 | 7/1965 | Pittendreigh et al. | 68—208 X |
| 3,237,635 | 3/1966 | Kozel | 137—403 X |

WIILLIAM F. O'DEA, *Primary Examiner*

D. R. MATTHEWS, *Assistant Examiner.*